US006340134B1

(12) United States Patent
Meschino (10) Patent No.: US 6,340,134 B1
(45) Date of Patent: Jan. 22, 2002

(54) WING COMBINATION FOR DRAG REDUCTION, AIRCRAFT INCLUDING SUCH A WING, AND A METHOD OF REDUCING THE DRAG OF AN EXISTING AIRCRAFT

(76) Inventor: Ronald G. Meschino, 8 Bushbury Dr., Don Mills (CA), M3A 2Z7

( * ) Notice: Subject to any disclaimer, the term of this patent is extended or adjusted under 35 U.S.C. 154(b) by 0 days.

(21) Appl. No.: 09/415,209

(22) Filed: Oct. 12, 1999

(51) Int. Cl.$^7$ ................................................. B64C 3/00
(52) U.S. Cl. ..................................... 244/45 R; 244/130
(58) Field of Search .............................. 244/45 R, 13, 244/15, 76 C, 215, 214, 35 R, 130

(56) References Cited

U.S. PATENT DOCUMENTS

| | | | | |
|---|---|---|---|---|
| 1,696,493 A | * | 12/1928 | Lenert | 244/45 R |
| 1,890,035 A | * | 12/1932 | Hall | 244/45 R |
| 2,084,502 A | * | 6/1937 | Rieder | 244/45 R |
| 2,576,294 A | * | 11/1951 | Geraci | 244/45 R |
| 2,910,254 A | * | 10/1959 | Razak | 244/13 |
| 3,734,432 A | * | 5/1973 | Low | 244/76 C |
| 5,088,661 A | * | 2/1992 | Whitener | 244/215 |
| 5,899,409 A | * | 5/1999 | Frediani | 244/35 R |
| 5,934,607 A | * | 8/1999 | Rising et al. | 244/130 |

FOREIGN PATENT DOCUMENTS

| | | | | |
|---|---|---|---|---|
| CH | 240342 | * | 4/1946 | 244/45 R |
| GB | 7660 | * | 11/1915 | 244/45 R |

OTHER PUBLICATIONS

Handbook of Airline Economics, First Edition, 1995, Aviation Week Group, pp. 367, 368.
Jane's All The World's Aircraft, 1998–1999, Jane's Infromation Group Limited, Coulsdon, Surrey, England, pp. 599–601.
Abbot et al, "Theory of Wing Sections", Jun. 1958, Dover Publications Inc., New York, pp. 463, 464, 625, 626.
McCormick, Barnes W. "Aerodynamics, Aeronautics, and Flight Mechanics", Second Edition, 1995, Daniel Greenway & Sons Ltd., England, p. 167.
Davies, D.P., "Handling the Big Jets" Third Edition, 1979, Daniel Greenway & Sons Ltd., England, p. 46.
Raymer, Daniel P., "Aircraft Design: A Conceptual Approach", Second Edition, 1992, AIAA Education Series, p. 398.
Hoerner, Dr. Ing, "Fluid Dynamic Drag", 1965, Hoerner Fluid Dynamics, Albuquerque, N.M., pp. 8–10.
Anderson, John D., "Introduction to Flight", Third Edition, 1989, McGraw Hill Inc., p. 220.
Pratt & Whitney, "Aircraft and Engine Characteristics", 23rd Edition, 1996 (6 pages).

* cited by examiner

*Primary Examiner*—Galen L Barefoot
(74) *Attorney, Agent, or Firm*—Bereskin & Parr (57) ABSTRACT

An apparatus and method are provided for reducing the drag of an aircraft wing. Many modern high speed aircraft have a low aspect ratio wing generating significant induced drag. The invention provides a drag reduction system, which is made up of a high aspect ratio supplementary wing connected to the fuselage by a streamlined fuselage connection, and at least two struts connecting the supplementary wing to the main wing. The drag reduction system is capable of reducing the total drag of a modern high speed, high altitude aircraft with a low aspect ratio cantilevered wing, by at least 29.1%. At least 65% of the total lift of the aircraft can be provided by the supplementary wing. The main wing then provides structural strength to transfer lifting loads to the fuselage of the aircraft, and for this purpose, the main wing and interconnections for the supplementary wing can be designed with this structural function in mind.

20 Claims, 4 Drawing Sheets

FIG. 2

WING COMBINATION FOR DRAG REDUCTION, AIRCRAFT INCLUDING SUCH A WING, AND A METHOD OF REDUCING THE DRAG OF AN EXISTING AIRCRAFT

FIELD OF THE INVENTION

This invention relates to a design of an aircraft wing and is concerned with reducing drag of an aircraft wing. More particularly, this invention is concerned with high speed, turbofan powered airline aircraft, having a low aspect ratio tapered wing. The invention is directed to a wing combination for drag reduction, and also to aircraft including such a wing combination, and also to various aircraft types designed within a group of performance parameter limits, and to a method of reducing the drag of an existing aircraft.

BACKGROUND OF THE INVENTION

From the very beginning of the power of flight, the design of aircraft structures has required the comprise between numerous conflicting requirements. Unlike land or water-based craft, an aircraft has to generate sufficient lift to support its own weight, and consequently minimizing weight has always been a significant design criteria for aircraft.

A corollary to this is that the design of the main wing must provide the necessary lift. The lift provided by any wing section will depend upon the section chosen and air speed. The wing should be capable of providing sufficient lift both during take-off and at cruise and other conditions. At steady cruising conditions, the thrust provided by an aircraft's engines balances the drag on the aircraft.

A significant element of drag can be induced drag. This in turn is largely dependent upon the wing profile. It has long been known that a high aspect ratio wing, i.e. a wing which is relatively long and slender, gives much reduced induced drag. However, a long, slender wing imposes severe structural loads. In effect, the lifting forces provide large cantilevered loads and large bending moments, which reach a maximum at the wing roots, at least for a monoplane design. A slender wing shape compounds this problem by providing a reduced thickness to the wing, reducing the bending moments that the wing can carry. Designing a wing that is sufficiently strong to withstand these loads can add excessive weight to the aircraft, thereby overcoming any advantages of a high aspect ratio wing design.

In the early days of aircraft development, when engines provided a relatively poor power-to-weight ratio, many aircraft were designed with multiple aerofoils, and a biplane design was common. An advantage of a biplane design is that the two aerofoils can be connected together by a combination of struts and bracing wires, so as to form an integrated structure. In effect, the two wings can form a composite beam having a depth equal to the spacing between the wings, hence a relatively light structure can provide significant structural strength. Commonly, in biplane or other multi-aerofoil designs, each wing or aerofoil would have generally similar or comparable dimension and they would all contribute generally equally to the lift. Additionally, each of the wings or aerofoils would have generally similar design characteristics in terms of aspect ratio, aerofoil section, etc.

As aircraft developed and engines became more powerful and reliable, aircraft speeds increased and it was possible to provide sufficient lift from just one wing. Hence, for at least the last sixty years, a monoplane design has been the most popular configuration for most practical aircraft. It is commonly believed that a monoplane design provides the most efficient aerofoil and, by eliminating any extra aerofoils, can reduce the overall drag characteristics of an aircraft.

In early aircraft, wings extended essentially transversely with little or no sweepback. Modern, high-speed aircraft, typically cruise at a speed relatively close to the speed of sound, for example, at Mach 0.8. At such speeds, it is necessary to provide wings with significant sweepback, in order to reduce drag.

Considerable effort and analysis is put into designing aircraft structures and particularly aircraft wings for modern aircraft. Commonly, sophisticated computational techniques are used to develop structures providing the highest degree of aerodynamic efficiency, while also being structurally efficient. As a result, many modern turbofan powered airline aircraft have sweptback, low aspect ratio wings. These wings commonly show a wing chord that is largest at the root and decreases significantly along the length of the wing towards the wing tip, so that the chord ratio between the wing root and the wing tip can be as high as 5. The overall wing aspect ratio can be less than 8.

Now, aircraft drag is directly related to the weight of an aircraft, which in turn will depend upon the weight of fuel carried by the aircraft. Fuel represents a significant element of a weight of an aircraft, and clearly the weight of the fuel will depend upon the intended duration of a flight. Fuel also represents one of the significant items in the operating cost of an airline company. The world's largest airline companies typically spend from $1 billion to $2 billion, each per year for fuel (Handbook of Airline Economics, First Edition, page 367, published by the Aviation Week Group). Thus, if a large airline company would purchase the aircraft that includes the 29.1% drag reduction, it would save between $291 million to $582 million per year. It will be shown later that a drag reduction of this order should be achievable for a typical modern aircraft. This would lead to a significant increase in net profit.

SUMMARY OF THE INVENTION

What the present inventor has realized is, despite all the effort put into designing modern aircraft wings, the low aspect ratio wings of many modern aircraft generate significant induced drag. The inventor has realized that this can be alleviated by providing a drag reduction system (DRS). This is counterintuitive, since it both increases the weight of the aircraft and increases drag, other than induced drag. However, it will be shown that if the supplementary wing of the DRS is given a high aspect ratio, it will cause a large reduction of both the induced drag and the profile drag of the wing of a modern high speed high altitude turbofan powered aircraft with a low aspect ratio wing, such as a Boeing 757-300. This reduction in drag will be much greater than any additional drag added by the DRS, thereby leading to an overall reduction in drag and the possibility of large fuel savings. These fuel savings translate into overall reductions in the operating weight of the aircraft, which more than compensates for the additional weight of the DRS.

It will be appreciated that a number of parameters in the basic aircraft design can be varied considerably. In general, the invention is applicable to high speed, high altitude aircraft, intended for both commercial and military applications. Typical parameters applicable to such aircraft are: a cruising speed in the range Mach 0.6 to 0.9; cruising altitude limits between 30,000 and 50,000 feet; a main wing aspect ratio in the range 7–11; in accordance with the present invention, an aspect ratio for the supplementary wing in the range 15–30; both the main wing and the supplementary wing can have sweep angles in the range 20–50°, and note that the wings can be swept both forward as well as backward. The invention is believed particularly applicable to aircraft in the weight range 50,000–1,000,000 lbs. Lift limits on the main wing are based on the maximum take-off weight divided by the wing area, and commonly limits are in the range 110–160 lbs per sq ft; supplementary wing area is usually expected to be in the range of 60–90% of the main wing area.

The example below gives a calculated drag reduction of 29.1%, for a Boeing 757-300 aircraft. This is a medium range airliner. It is expected that application of this invention to a low range aircraft would yield a substantially lower percentage drag reduction; on the other hand, application to a high range aircraft should give a substantially higher percentage drag reduction.

In accordance with a first aspect of the present invention, there is provided an aircraft comprising: a body; a supplementary wing comprising two wing sections extending outwardly on either side of the body, to provide lift for the body; and a wing support structure for the supplementary wing extending between the body and the supplementary wing, wherein the supplementary wing is configured to reduce induced drag and the supplementary wing by itself has insufficient strength to support the aircraft, wherein the wing support structure comprises a main wing and provides additional strength to withstand loads applied to the supplementary wing by lift forces at least and wherein the main wing extends outwardly from the body spaced from the supplementary wing and the wing support structure includes at least two connections between the main wing and the supplementary wing transferring loads between the supplementary wing and the main wing.

Preferably, each wing section of the supplementary wing comprises a supported inner section and a cantilevered section extending out from the supported inner section, the supported inner section being connected to the main wing by the connections. The supported inner section of each wing can extend over more than half the length of each wing section.

The connections advantageously comprise struts that are in tension between the supplementary wing and the main wing.

The main wing is preferably adapted to provide part of the lift required for the aircraft during take-off and landing, and includes at least one of: high lift devices; ailerons; an air brake; and a fuel storage means.

The supplementary wing can be such as to provide between 65% to 85% of the total lift of the aircraft in cruising flight at least.

Another aspect of the present invention provides a method of reducing the drag of an existing high speed aircraft, which comprises a body and an existing wing structure having a low aspect ratio wing, the method comprising:
 (a) providing a supplementary wing comprising a pair of supplementary wing sections and having a higher aspect ratio than the existing wing but insufficient strength to transfer the full lift required to the aircraft fuselage, whereby the supplementary wing has a relatively light weight.
 (b) attaching the supplementary wing to the body and the existing wing of the aircraft and configuring the supplementary wing so that a major portion of the lift required for the aircraft is provided by the supplementary wing, and so that a substantial part of the lift provided by the supplementary wing is transferred to the existing wing.

Many modern aircraft have low mount wings, and for such aircraft, the method can comprise mounting the supplementary wing to the top of the body and spaced above the existing wing.

BRIEF DESCRIPTION OF THE DRAWING FIGURES

For a better understanding of the present invention and to show more clearly how it may be carried into effect, reference will now be made, by way of example, to the accompanying drawings which show a preferred embodiment of the present invention and in which:

FIG. 1 shows, respectively, a top plan view (FIG. 1a), a front view (FIG. 1b) and side view (FIG. 1c) of a Boeing 757-300 aircraft;

FIG. 3 shows, respectively, a side view (FIG. 3a), a front view (FIG. 3b), and a plan view (FIG. 3c) of a strut for connecting the supplementary wing of the present invention to the wing of a Boeing 757-300 aircraft; and FIG. 4 shows, respectively, a plan view (FIG. 4a), a front view (FIG. 4b) and a side view (FIG. 4c) of a Boeing 757-300 aircraft modified in accordance with the present invention to include the supplementary wing, the streamlined fuselage connection, and the four struts, of the present invention.

DETAILED DESCRIPTION OF THE PREFERRED EMBODIMENTS

The complete design of a large, modern aircraft is a very expensive and complex undertaking. For the purpose of illustrating the present invention, a preferred embodiment has been developed, based on an existing commercial aircraft, so as to take advantage of the extensive design work and expertise already expended in completing that design. It will, however, be appreciated that the general principles developed from this example are applicable to any aircraft.

As detailed below, the present invention proposes the addition of a DRS to the existing wing structure of an aircraft. This DRS in combination with the aircraft wing, is able to reduce the drag of the aircraft without the DRS. It will be appreciated that, when designing a wholly new aircraft, this will alter the design of the original wing, and in particular the original wing will include structural connections from the supplementary wing. This would increase the thickness to chord percentage ratio reduction from wing root to wing tip. The main requirement here is that structural characteristics at least of the original wing be retained, so as to provide a significant, and possibly the major, structural element of the combined wing structure. It is envisaged that the major portion of the lift forces could be transmitted through the original wing to the fuselage.

An example is set out below for a Boeing 757-300 aircraft. It will be shown that a DRS adds a small weight to the original Boeing 757-300 aircraft. It also adds a small induced drag, a small profile drag, and a small interference drag. However, there is a structural interaction between the supplementary wing and the Boeing 757-300 wing. The supplementary wing takes over 75% of the total aircraft weight, and the original Boeing 757-300 wing takes around 25% of the total aircraft weight. This results in a major reduction of the induced drag of the Boeing 757-300 wing, and a large reduction of the profile drag of the Boeing 757-300 wing. When the small drag increases of the DRS are subtracted from the larger drag reductions of the Boeing 757-300 wing, the balance is a total drag reduction of 5,654.8 lbs or 29.1% of the 19,458.3 lbs total drag of the entire Boeing 757-300 aircraft without the DRS.

The aircraft selected for exemplifying the present invention is the Boeing 757-300 aircraft, designed and produced by the Boeing Commercial Airplane Group. The detailed lift and drag characteristics of the wing of this aircraft have not been published. As will be understood, the whole aircraft, particularly the wing structure, will have been designed using sophisticated analytical techniques. The detailed aerodynamic design will have ensured that the wing is the most efficient structure currently possible, given the basic design characteristics of the wing, e.g. length, chord dimensions, aspect ratios, etc.

For the present purpose it is noted that the thickness to chord percentage ratio of the Boeing 757-300 aircraft wing is in the region of 15% at the wing root and 10% at the wing tip. On this basis, calculations are made of the aerodynamic characteristics of the 757-300 wing. These are based on standard tests and principles that are well established. The calculations for the modified Boeing 757-300 wing are based on the NACA 652-015 airfoil section. The lift and drag characteristics of this NACA airfoil section have been published and are well known throughout the world. Additionally, these calculations are based on a thickness to chord percentage ratio of 15%, constant from wing root to wing tip. This is conservative, since it is noted the percentage reduces to 10% of the wing tip.

A further consideration is that there are a large number of variables which effect the performance of the Boeing 757-300 or any aircraft. For the present purposes, key variables are the number of passengers (as represented by their weight and the weight of their luggage) or the weight of cargo carried; the weight of fuel; and the intended duration of the flight, which in turn will effect the fuel weight at take-off. It is practically impossible to cover all combinations of these variables. Accordingly, the example that is detailed below is based on a typical set of operating conditions, more particularly, the operating conditions that would be found, when cruising, at the midpoint through a flight that is of typical length and of typical load.

While the invention is described below in relation to a Boeing 757-300 aircraft, it will be appreciated that the invention is applicable to many modern high-speed airline aircraft, in particular, as noted, it is applicable to aircraft having a low aspect ratio tapered wing, which results in high induced drag. The drawings show a Boeing 757-300 aircraft schematically. While the basic elements of this aircraft are conventional, by way of introduction, they are first detailed in the following paragraphs.

Figures 1A, 1B, 1C:
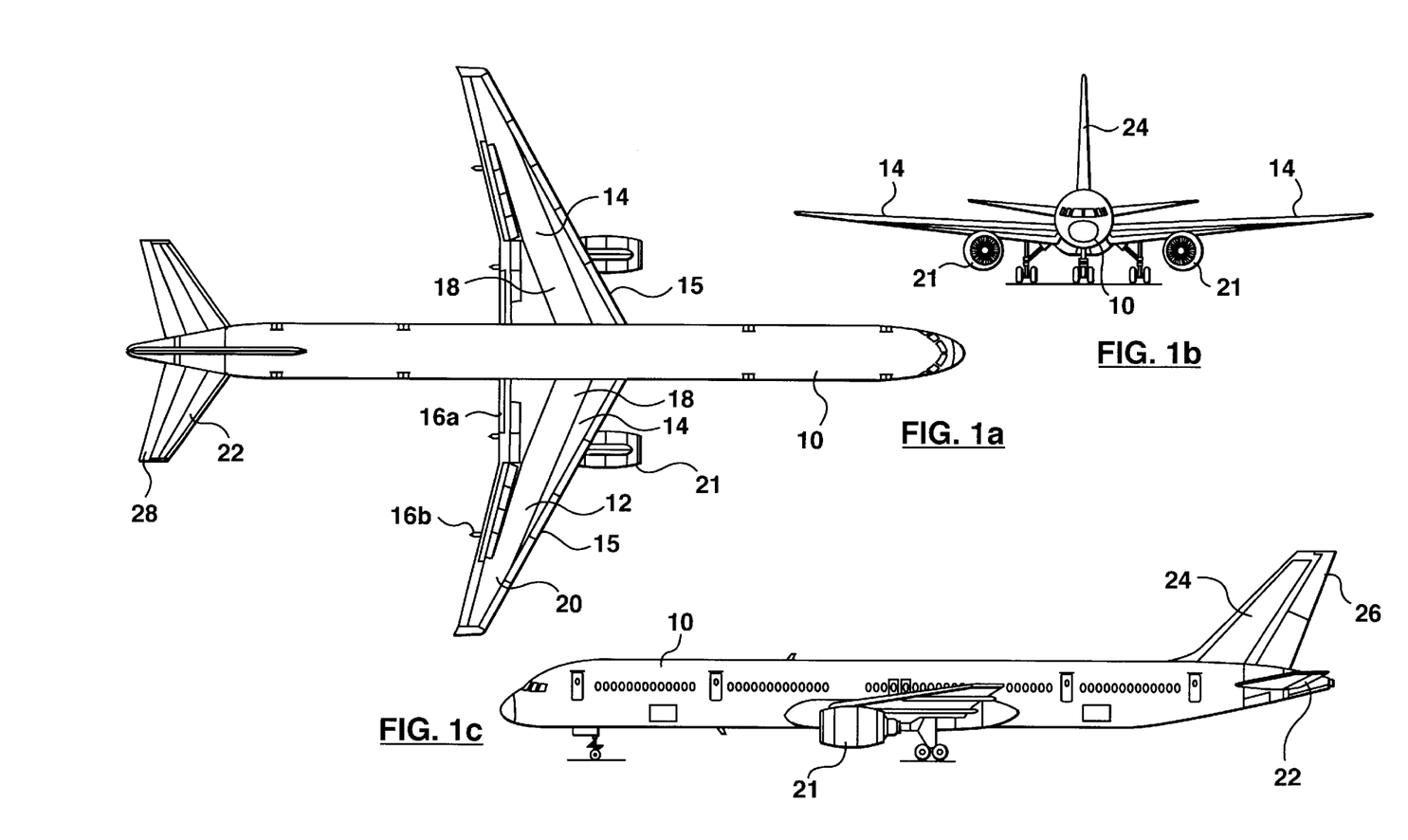

Referring to FIG. 1, the aircraft has a fuselage 10 which is of generally constant cross-section throughout most of its length. A main wing 12 has two wing sections 14 extending out from the fuselage 10. As shown, the wing sections 14 have leading edges 15 which are inclined at an angle to the fuselage, so that the wing sections 14 are swept back rearwardly. A trailing edge of each wing section comprises an inboard portion 16a which is generally perpendicular to the fuselage and an outboard portion 16b which is inclined at an angle.

The overall effect is to create, for each wing section 14, an inboard wing section 18 whose chord length tapers rapidly in an outward direction from the fuselage towards the wing tip; and an outboard wing section 20 whose chord length tapers less rapidly again outwardly and towards the wing tip.

Two engines 21 are mounted beneath the wing sections 14 on pylons in known manner. The engines are mounted approximately at the junction between the inboard and outboard wing sections 18, 20.

A horizontal stabilizer 22 and elevators 28 are swept back as in the main wing 12. A vertical stabilizer 24 and rudder 26 are both swept back as in the main wing 12.

The engines or power plants are either two Rolls Royce RB 211-535E4-B turbofans or two Pratt & Whitney PW 2043 turbofans. These have very similar characteristics, with the Rolls Royce engines providing 43,100 lb st and the Pratt & Whitney engines providing 43,850 lb st.

The basic characteristics of a standard Boeing 757-300 aircraft is set out in the following Table 1.

TABLE 1

| External Dimensions Boeing 757-300 | | |
|---|---|---|
| Wing span | | 124 ft 10 in |
| Wing chord at root | | 26 ft 11 in |
| Wing chord at tip | | 5 ft 8 in |
| Wing aspect ratio | | 7.8 |
| Wing sweep at quarter chord | | 25° |
| Length overall | | 178 ft 7 in |
| Areas | | |
| Wing 12 gross (total for both wing sections 14) | | 1,994.0 sq ft |
| Fin 24 | | 370.0 sq ft |
| Rudder 26 | | 125.0 sq ft |
| Tailplane 22 | | 542.0 sq f |
| Elevators 28, total | | 135.0 sq ft |
| Weights and Loadings (240 Passengers) | | |
| A Rolls Royce 211-535E4-B | | |
| B Pratt & Whitney PW 2043 | | |
| Operating weight empty | A | 142,400 lbs |
| | B | 142,110 lbs |
| Maximum take-off weight | A, B | 270,000 lbs |
| Maximum landing weight | A, B | 224,000 lbs |
| Maximum zero fuel weight | A, B | 210,000 lbs |
| Maximum fuel storage | A, B | 76,983 lbs |
| Performance (240 passengers at maximum take-off weight except where indicated) | | |
| Cruising speed | | Mach 0.8 |
| Approach speed, flaps down, at maximum landing weight | A, B | 164 mph |
| Take-off field length, sea level, 30° C. | A | 8,950 ft |
| | B | 9,000 ft |
| Landing field length at maximum landing weight | A | 5,600 ft |
| | B | 5,770 ft |
| Range | A | 3,763 miles |
| | B | 4,010 miles |

As noted, much of the aerodynamic characteristics of the Boeing 757-300 has not been published. The following Table 2 sets out basic flight operating conditions and data that have been assumed, in order to carry out a drag analysis.

TABLE 2

BASIC FLIGHT OPERATING CONDITIONS AND ASSUMED DRAG ANALYSIS

| | |
|---|---|
| Main wing airfoil section used in this report | NACA $65_2$-015 |
| Cruising altitude | 40,000 ft |
| Air density = $\rho$ = | Slugs per cubic foot |
| Air density at 40,000 ft of altitude | 0.00058727 slugs per cubic foot |
| Mach 1 (speed of sound) at 40,000 ft. of altitude | 968.08 fps |
| Cruising speed = V | fps |
| V = Mach 0.8 × 968.08 = | 774.464 fps (528.04 mph) |

TABLE 2-continued

BASIC FLIGHT OPERATING CONDITIONS AND ASSUMED DRAG ANALYSIS

| | |
|---|---|
| Normal dynamic pressure = 0.5 × air density (ρ) × $V^2$ = 0.5 × 0.00058727 × $774.464^2$ | 176.1 lbs per sq ft |
| Wing sweep at quarter chord | 25° |
| Air velocity normal to quarter chord = $V_n$ $V_n$ = 774.464 × cos 25° = 774.464 × 0.90631 | 701.905 fps |
| Sweep dynamic pressure = 0.5 × air density × $V_n^2$ = 0.5 × 0.00058727 × $701.905^2$ | 144.665 lbs per sq ft |

Note 1:
The purpose of this invention is to establish a percentage drag reduction that can be achieved when it is compared to the drag of an aircraft that is well established. The Boeing 757-300 aircraft has therefore been chosen as a basis of comparison. Three changes have been made to the Boeing 757-300 aircraft from a drag point of view. The first change is the addition of the DRS of this invention. The second change is the use of the NACA $65_2$-015 airfoil section with a constant thickness to chord ratio from wing root to wing tip. The third change is to adjust the angle of incidence of the main wing so that it is able to maintain a lift coefficient of 0.2 in cruising flight, and to adjust the angle of incidence of the supplementary wing that is the main part of the DRS, to 0.8 in cruising flight. All other aspects of the Boeing 757-300 aircraft have been maintained. These are as follows: the exact fuselage and tail assembly, the exact dimensions of the wing in plan view, the exact dihedral angle of the wing, the exact high lift devices for the take-off and landing procedures, the exact aerodynamic and retractable brake system, the exact fuel storage system.

Note 2:
The wing sweep at quarter chord, as noted from Table 1 is taken to be 25°. It is noted that each wing section 14 has two distinct sections so that the wing sweep will vary along the length of the wing. A figure of 25° again is a reasonable assumption. It is standard to take this figure at quarter chord, which approximates to the center of lift at each point along the wing.

The Boeing 757 aircraft in a fairly common configuration is intended to carry 240 passengers. For the present purposes, it is assumed that there will be an average of 200 passengers on a flight. This reduces the total payload by the weight equivalent to all 240 passengers and their luggage. As noted, the present example is based on calculating operating conditions at the half-way point of a typical flight. Relevant weight figures for this operating condition are set out in the following Table 3:

TABLE 3

WEIGHT AND DRAG CALCULATIONS OF BOEING 757-300 AIRCRAFT

| | |
|---|---|
| Maximum take-off weight | 270,000 lbs |
| Maximum zero fuel weight | 210,000 lbs |
| Maximum fuel storage | 76,983 lbs |
| Maximum of 200 passengers for an average flight 240 passengers − 200 passengers = 40 passengers | |
| 40 passengers × 200 lbs | 8,000 lbs |
| Maximum fuel carried = 60,000 lbs + 8,000 lbs | 68,000 lbs |
| Fuel used to taxi, take-off, climb to 40,000 feet of altitude | 5,000 lbs |
| Fuel usable to cruise at 40,000 ft = 68,000 − 5,000 | 63,000 lbs |
| Fuel used for half range = 63,000 lbs/2 | 31,500 lbs |
| Aircraft weight at half range = 270,000 lbs − 5,000 lbs − 31,500 lbs | 233,500 lbs |

Thus, the difference between the maximum zero fuel weight and the maximum take-off weight is 60,000 lbs, i.e. the weight otherwise available for fuel storage. As noted in Table 3, assuming 40 passengers less than the maximum permitted and allowing 200 lbs per passenger and luggage, gives an additional 8,000 lbs of weight for fuel that can be carried. Thus, the maximum fuel carried is 68,000 lbs (the difference between the maximum zero fuel and the maximum take-off weight plus the 8,000 lb margin derived from the average passenger load).

As Table 3 shows, assuming 5,000 lbs of fuel are used to taxi, take-off and climb to 40,000 feet of altitude, this leaves 63,000 lbs of fuel for the main portion of the flight. At mid-range, it is assumed that half of this amount, 31,500 lbs has been consumed. Thus, at mid-range, the aircraft weight is calculated at 233,500 lbs.

With the weight calculated, calculations can then be made for the lift and drag performance of the Boeing 757-300 aircraft.

TABLE 4

CALCULATION OF WING PROFILE DRAG, WING INDUCED DRAG AND WING TO FUSELAGE INTERFERENCE DRAG

| | |
|---|---|
| Aircraft weight lift coefficient ($C_1$) × sweep dynamic pressure × wing area 233,500 lbs = $C_1$ (144.665) 1,994.0 = $C_1$ (288,462) | |
| $C_1$ = 233,500 lbs/288,462 = | 0.81 |
| Wing profile drag coefficient ($C_{dp}$) | 0.0115 |
| Wing profile drag = $C_{dp}$ × sweep dynamic pressure × wing area | |
| Wing profile drag = 0.0115 (144.665) 1,994.0 | 3,317.3 lbs |
| Wing induced drag coefficient ($C_{di}$) = $C_1^2/\pi$ × 0.9 × aspect ratio | |
| Wing $C_{di}$ = $0.81^2/3.1416$ × 0.9 × 7.8 | 0.0300 |
| Wing induced drag = 0.0300 (144,665) 1,994.0 | 8,653.9 lbs |
| Wing to fuselage interference drag = 0.04 (3,317.3) | 132.7 lbs |
| TOTAL WING DRAG | 12,103.9 lbs |
| Lift to drag ratio for the entire Boeing 757-300 aircraft = L/D = 12 | |
| Mid cruise weight = 233,500 lbs | |
| Drag for the entire aircraft at 40,000 feet of altitude at mid cruise weight = 233,500 lbs/12 | 19,458.3 lbs |
| DIFFERENCE | 7,354.4 lbs |

Thus, the lift coefficient, $C_{lm}$ is calculated back from the known values of the aircraft weight, sweep dynamic pressure and wing area, to give a lift coefficient of 0.81.

The above coefficient of 0.81 can then be used to find the profile drag coefficient in Reference 3, page 625 to give a value of 0.0115. The wing profile drag can then be calculated as follows: Profile drag of the main wing=0.0115×144.665× 1994.0 sq ft=3,317.3 lbs.

The induced drag coefficient $C_{di}$ is calculated in the formula given and is derived from the lift coefficient $C_l$. Here, the aspect ratio is taken as 7.8 (as given in jane's All the World's Aircraft). The factor 0.9 is the span efficiency factor and is taken from "Introduction to Flight" by John Anderson Jr., Third Edition, 1989; McGraw Hill, Inc. This gives an induced drag coefficient of 0.300. The wing induced drag can then be calculated, as shown, to give a value of 8,653.9 lbs.

The wing to fuselage interference drag is calculated at 0.04× the profile drag, and this calculation is taken from McCormick, Barnes W., "Aerodynamics, Aeronautics and Flight Mechanics", Second Edition, John Wiley & Sons, Inc., 1995 at page 167. This gives a value of 132.7 lbs.

This gives a total wing drag of 12,103.9 lbs. Taken by itself, this would suggest a lift to drag ratio of in excess of 19, which is normal for the wing itself, but does not allow for drag by the fuselage and other elements. Thus, in his book, "Handling the Big Jets" by Davies, D. P., Third Edition, Daniel Greenway & Sons Ltd., England, 1979, at page 46, it is noted that, for modern aircraft of this sort the overall lift to drag (L/D) ratio is typically 12.

If one applies this figure to the mid-range cruise weight of 233,500 lbs, this gives a drag of an entire aircraft at 40,000 ft altitude of 19,458.3 lbs. This gives a difference of 7,354.4 lbs. The difference is probably accounted for by fuselage drag, tail drag, and tail to fuselage interference drag.

Figures 4A, 4B, 4C:
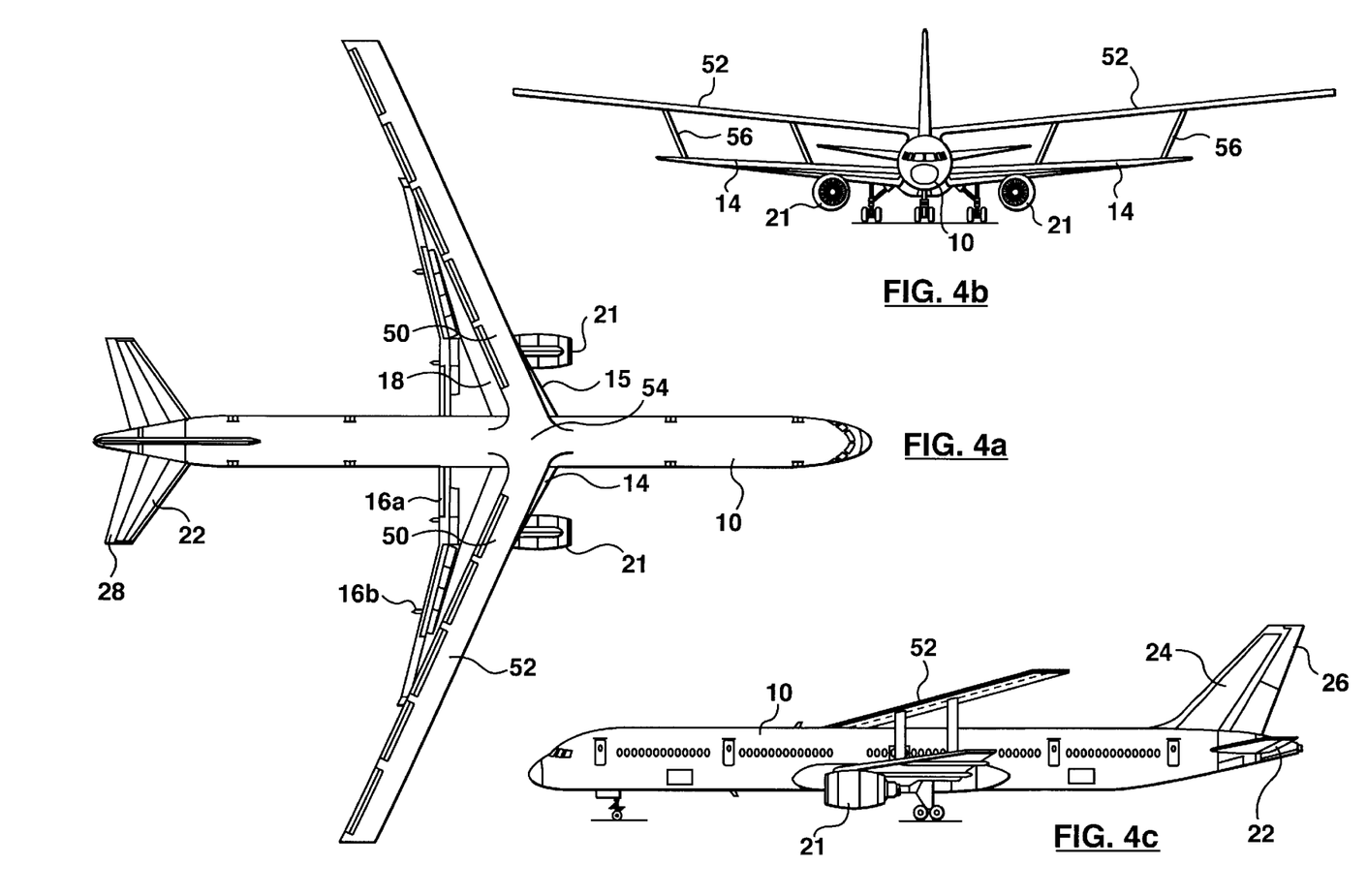

Now, in accordance with the present invention, there is provided an additional DRS, which is indicated generally by the reference 50, 54, 56. As is detailed below, a key concept behind the introduction of the DRS is a unique combination of aerodynamic characteristics and structural characteristics. More particularly, it is recognized that the aerodynamic and structural requirements for a wing can be separated and supplied separately. In effect, in this specific embodiment, the bulk of the lift, the aerodynamic characteristic, is proposed to be provided by the supplementary wing 50; however, the bulk of the structural strength of the wing system will still be provided by the main wing 12. It is also recognized that, in a more practical, working embodiment, the main and supplementary wings would be designed together, to give the overall characteristics desired, and this is explained in greater detail later.

The DRS comprises a high aspect ratio supplementary wing 50, a streamlined connection 54 to the fuselage 10, and four struts 56 which are streamlined.

Figure 3A:
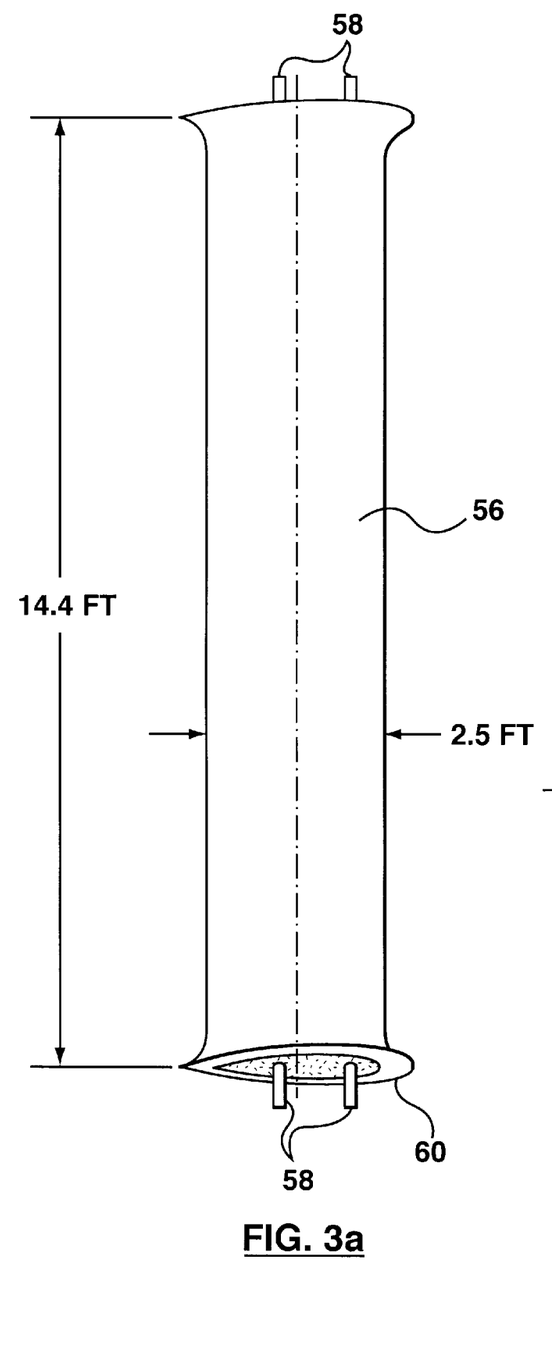
Figure 3B:
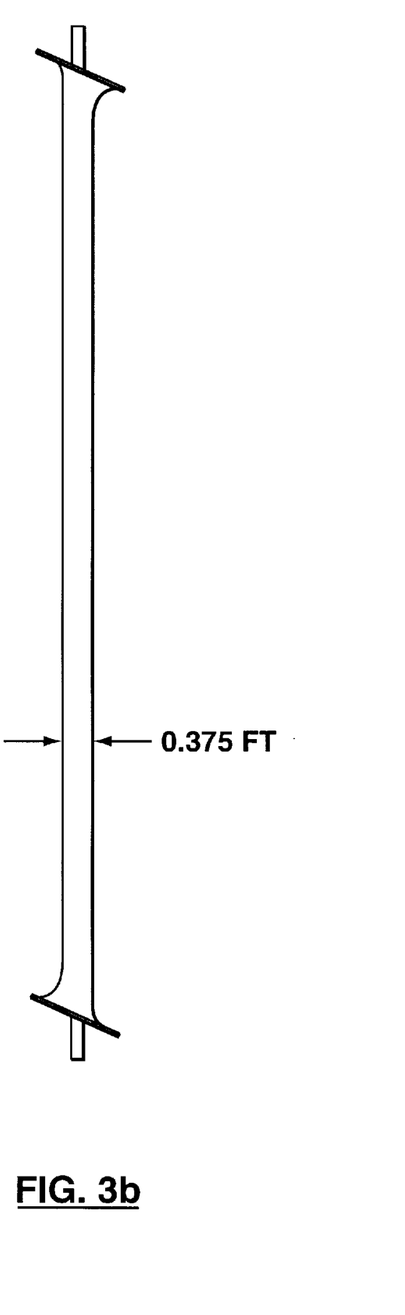
Figure 3C:
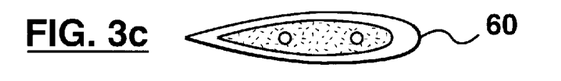

Details of the struts 56 are shown in FIG. 3. Each strut 56 has an airfoil section, as indicated in the cross-section of FIG. 3b. To secure each strut to the wings 12, 50, metal tubes 58 extend out from the top and bottom of each strut 56. A streamlined faring 60 is provided at the top and bottom of each strut 56, to provide a streamlined connection with the wings. Each strut could be 14.4 ft high with a chord of 2.5 ft. The top and bottom of each strut 56 is now designed so that it can be mounted at an angle to the supplementary wing 50 and to the main wing 12. This makes it possible to increase the aspect ratio of the supplementary wing, which would then reduce the induced drag of the supplementary wing.

Referring back to FIG. 2, the supplementary wing 50 is made up of two sections 52, a left section with a length of 105 ft and a right section with a length of 105 ft. The struts 56 divide each supplementary wing section 52 into an inboard section 52a with a length of 30 ft, a middle section 52b with a length of 30 ft, and an outboard section 52c with a length of 45 ft. The trailing edge of the supplementary wing 50 has 10 sections of hinged double slotted flaps which are used as high lift devices during the take-off and landing procedures, and which can be of known design. Additionally, the supplementary wing 50 can be configured to provide a small amount of fuel storage.

Figure 2:
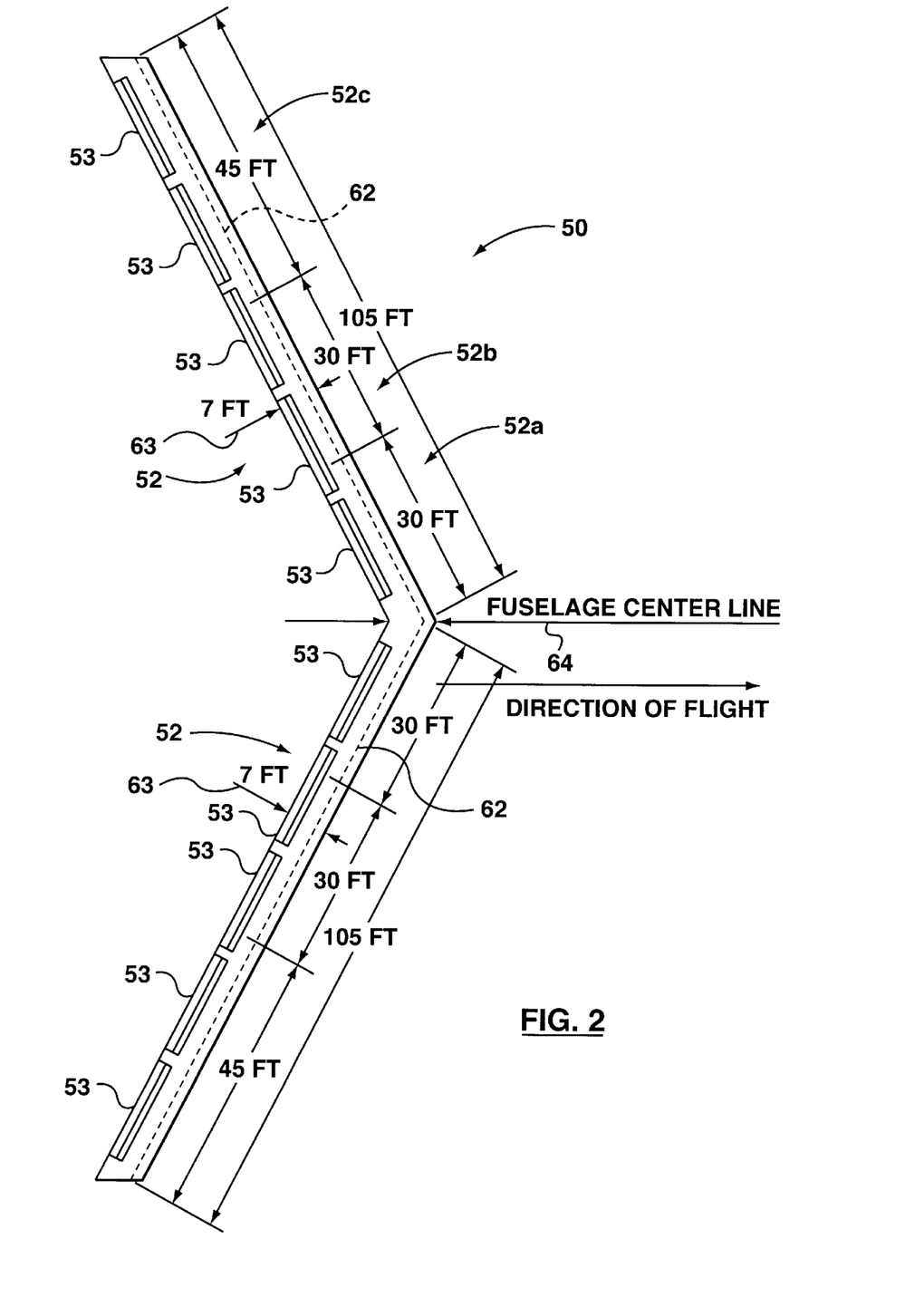
FIG. 2 is a plan view of a supplementary wing in accordance with the present invention.

The dotted line 62 in FIG. 2 indicates the quarter chord line. Corresponding to the main wing 12, this has a sweep angle of 25°.

The struts 56 are positioned so that the inboard and middle sections 52a, 52b each have a length of 30 feet, while the outboard section has a length of 45 feet, all measured along the quarter chord line 62.

The supplementary wing 50 has a width along its entire length of 7 ft indicated at 63. For the sweep angle of 25°, the chord the chord of the supplementary wing, along the entire length thereof is calculated by. 7 ft/cos 25°=7/0.90631= 7.724 ft.

Here, to give a lower profile drag, a thinner airfoil section with a 12% thickness to chord length ratio was chosen. More particularly, an NACA 0012 airfoil section was chosen (Ira H. Abbott, Albert E. Von Doenhoff, Theory of Wing Sections: Dover Publications, Inc., New York, June, 1958). Details of the supplementary wing 50 are set out in the following Table 5.

TABLE 5

SUPPLEMENTARY WING 50

| | |
|---|---|
| Wing airfoil section | NACA 0012 |
| Sweep angle at quarter chord | 25° |
| Wing length | 210 ft |
| Wing span = 210 ft × cos 25° = 210 ft × 0.90631 | 190.3251 sq ft |
| Wing width measured perpendicular to the quarter chord | 7 ft |
| Wing aspect ratio = (190.3251 ft)$^2$/1,470 sq ft | 24.642 |
| Wing chord at root without fillets = 7 ft/cos 25° = 7 ft/ 0.90631 | 7.724 ft |
| Wing chord throughout the entire length | 7.724 ft |
| Area of 2 blade sections 60 ft from fuselage center (inboard and middle sections 52a, 52b) = 2 × 7 ft × 60 ft | 840 sq ft |
| Area of 2 blade sections 60 ft from fuselage center to wing tip (outboard section 52c) = 2 × 7 ft × 45 ft | 630 sq ft |
| Wing area = 840 sq ft + 630 sq ft | 1,470 sq ft |
| Weight of 2 blade sections 60 ft from fuselage center = 840 sq ft × 3.5 lbs per sq ft | 2,940 lbs |
| Weight of 2 blade section 60 ft from fuselage center to wing tip = 630 sq ft × 10 lbs per sq ft | 6,300 lbs |
| Weight of entire high aspect ratio supplementary wing | 9,240 lbs |

It can be noted from this Table 5 that two assumptions have been made concerning the weight per square foot of this wing 50. Thus, for the inboard and middle sections 52a, 52b, it is assumed that these sections can be structurally simple, and in particular no large bending moments will be carried by them. This is because the lifting force that is applied to these sections 52a, 52b are transferred by the struts 56 through to the main wing sections 14. Thus, a weight per square foot of 3.5 lbs/sq ft is assumed.

On the other hand, the outboard sections 52c are simply cantilevered outwardly from the outermost struts 56. Accordingly, for these sections, a weight of 10 lbs/sq ft was assumed. This is taken from "Aircraft Design: A Conceptual Approach", Raymer, Daniel P., Second Edition, published by AIAA Education Series, 1992, page 398.

This gives a weight for the inboard and middle sections 52a, 52b of 2,940 lbs. The outboard sections 52c have a total weight of 6,300 lbs, for an overall weight of 9,240 lbs.

In the following Table 6, details of the struts 56 are set out. Again, the same basic NACA wing profile as for the main wing 12 is assumed.

TABLE 6

STRUTS 56

| | |
|---|---|
| Airfoil section | NACA 65$_2$-015 |
| Length | 14.4 ft |
| Chord | 2.5 ft |
| Area = 14.4 ft × 2.5 ft | 36 sq ft |
| Weight = 36 sq ft × 5 lbs per sq ft | 180 lbs |
| Weight of four struts = 4 × 180 lbs | 720 lbs |

As noted, the struts 56 have a length of 14.4 ft and a chord of 2.5 ft, for a total area of 36 sq ft. Assuming the weight per square foot is 5 pounds, this gives a weight of 180 lbs/strut, for a total weight of 720 lbs for the four struts.

The following Table 7 summarizes the weight calculation for the DRS.

TABLE 7

| | |
|---|---|
| Supplementary wing 50 | 9,240 lbs |
| Streamlined fuselage connection 54 | 200 lbs |
| Four struts 56 | 720 lbs |
| Total weight | 10,160 lbs |

As noted, a weight of 200 lbs is assumed for the streamlined fuselage connection 54. This gives a total weight of 10,160 lbs, and for brevity in the following tables the overall structure is referred to as DRS.

A calculation will now be made of the flight operating conditions and data for the modified Boeing 757-300 with the DRS in place. These details are given in the following Table 8.

TABLE 8

FLIGHT OPERATING CONDITIONS AND DATA OF BOEING 757-300 WITH COMPLETE DRS IN PLACE

| | |
|---|---|
| Cruising altitude | 40,000 ft |
| Air density = $\rho$ = | Slugs per cubic foot |
| Air density at 40,000 ft of altitude | 0.00058727 slugs per cubic foot |
| Mach 1 (speed of sound) at 40,000 feet of altitude | 968.08 fps |
| Cruising speed in miles per hour = V = Mach 0.8 × 968.08 fps = | 774.464 fps |
| V = 774.464 fps/1.467 | 527.92 mph |
| Normal dynamic pressure = 0.5 × 0.00058727 × $774.464^2$ | 176.121 lbs per sq ft |
| Air velocity normal to quarter chord = $V_n$ | |
| $V_n$ = 774.464 × cos 25° = 774.464 × 0.90631 | 701.905 fps |
| Sweep dynamic pressure = 0.5 × 0.00058727 × $701.905^2$ | 144.665 lbs per sq ft |
| CALCULATIONS FOR THE SUPPLEMENTARY WING 50 | |
| Aspect ratio for supplementary wing 50 | 24.642 |
| Supplementary wing sweep angle at quarter chord | 25° |
| Supplementary wing length | 210 ft |
| Supplementary wing span = 210 ft × cos 25° = 210 ft × 0.90631 = | 190.3251 ft |
| Supplementary wing area = 7 ft × 210 ft = | 1,470 sq ft |
| Aspect ratio = $(190.3251 \text{ ft})^2$ /1,470 sq ft = | 24.642 |
| Area of 2 supplementary wing sections 60 ft from fuselage center = 2 × 60 ft × 7 ft | 840 sq ft |
| Area of 2 cantilevered supplementary wing sections 60 ft from fuselage center = 2 × 45 ft × 7 ft | 630 sq ft |
| Total area of supplementary wing | 1,470 sq ft |
| Weight of 2 supplementary wing sections 60 ft from fuselage center = 840 sq ft × 3.5 lbs per sq ft | 2,940 lbs |
| Weight of 2 supplementary wing sections 60 ft from fuselage center to wing tips = 630 sq ft × 10 lbs per sq ft | 6,300 lbs |
| Weight of entire supplementary wing | 9,240 lbs |
| Length of 2 cantilevered supplementary wing sections = 2 × 45 | 90 ft |
| Area of 2 cantilevered supplementary wing sections | 630 sq ft |
| Aspect ratio for 2 cantilevered wing tip sections = (90 ft × cos 25° $)^2$/630 sq ft = $81.5679^2$/630 sq ft | 10.56 |

The following Table 9 then sets out the weight and drag calculations for the modified Boeing 757-300 with the DRS.

TABLE 9

WEIGHT CALCULATIONS OF BEING 757-300 WITH THE COMPLETE DRS IN PLACE

| | |
|---|---|
| Maximum take-off weight | 270,000 lbs |
| Maximum zero fuel weight | 210,000 lbs |
| Maximum fuel storage | 76,983 lbs |
| Assume an average of 200 passengers out of a maximum of 240 passengers | |
| 40 passengers × 200 lbs weight of each passenger with luggage | 8,000 lbs |
| Maximum fuel carried = 270,000 lbs − 210,000 lbs + 8,000 | 68,000 lbs |
| Fuel used to taxi, take off, climb to 40,000 feet of altitude | 5,000 lbs |
| Fuel used to cruise at 40,000 feet of altitude = 68,000 lbs − 5,000 lbs | 63,000 lbs |
| Fuel used during half range cruise = 63,000 lbs/2 | 31,500 lbs |
| Boeing 757-300 weight at half range cruise = 270,000 lbs-5,000 lbs-31,500 lbs | 233,500 lbs |
| Total weight of DRS | 10,160 lbs |
| Total weight of Boeing 757-300 with complete DRS in place at half range cruise = 233,500 lbs + 10,160 lbs | 243,660 lbs |
| LIFT CALCULATIONS FOR MAIN WING 12 AND SUPPLEMENTARY WING 50 | |
| Total weight of Boeing 757-300 with complete DRS in place | 243,660 lbs |
| Assume that main wing lift coefficient $C_{1m}$ = 0.2 (approx 25% original value) | |
| Lift of main wing 12 = $C_{1m}$ × sweep dynamic pressure × wing area = 0.2 × 144.665 × 1,994 | 57,692 lbs |
| Weight to be supported by supplementary wing 50 | 185,968 lbs |
| Lift coefficient for supplementary wing 50 =$C_{1s}$ | |
| Lift of supplementary wing 50 = $C_{1s}$ × sweep dynamic pressure × wing area = $C_{1s}$ × 144.665 × 1,470 | 185,968 lbs |
| $C_{1s}$ = 185,968 lbs/144.665 × 1,470 sq ft = | 0.875 |

TABLE 9-continued

DRAG CALCULATION FOR MAIN WING 12 MODIFIED BY THE DRS

Profile drag coefficient $C_{dpm} = 0.005$
Main wing 12 profile drag = $C_{dpm}$ × sweep dynamic pressure × wing area      1,442.3
= 0.005 × 144.665 × 1,994.0
Induced drag coefficient $$C_{dim} = \frac{C_{lm}^2}{\pi \times 0.9 \times \text{aspect ratio}}$$

$$= \frac{0.2^2}{3.1416 \times 0.9 \times 7.8} = 0.0018$$

Main wing 12 induced drag = $C_{dim}$ × sweep dynamic pressure × wing area      519.2 lbs
= 0.0018 × 144.665 × 1,994.00
Wing 12 to fuselage interference drag = $C_{d.int}$ × wing profile drag
= 0.04 × 1,442.3 lbs      57.7 lbs Main wing 12 total drag      2,019.2
DRAG CALCULATION FOR SUPPLEMENTARY WING 50, THE FOUR STRUTS 56, AND
THE SUPPLEMENTARY WING TO FUSELAGE INTERFERENCE DRAG $C_{ls} = 0.875$
Profile drag coefficient = $C_{dps} = 0.0125$
Supplementary wing 50 profile drag
= $C_{dps}$ × sweep dynamic pressure × wing area
= 0.0125 × 144.665 × 1,470 sq ft      2,658.2 lbs
Induced drag coefficient $$C_{dis} = \frac{C_{ls}^2}{\pi \times 0.9 \times \text{aspect ratio}}$$

$$= \frac{0.875^2}{3.1416 \times 0.9 \times 24.642} = 0.01099$$

Induced drag = $C_{dis}$ × sweep dynamic pressure × wing area      2,337.1 lbs
= 0.01099 × 144.665 × 1,470
Area of one strut = 36 sq ft
Profile drag of one strut = $C_{dp.st}$ × normal dynamic pressure × strut area      126.8 lbs
= 0.005 × 176.121 × 36 sq ft = 31.7 lbs; profile drag of four struts = 4 × 31.7
Supplementary wing to fuselage interference drag
= supplementary wing to fuselage interference drag coefficient × profile drag
= 0.02 × 2,658.2 lbs =      53.2 lbs
INTERFERENCE DRAG CALCULATIONS BETWEEN SUPPLEMENTARY WING 50 AND
THE TOP OF FOUR STRUTS 56, AND BETWEEN THE MAIN WING 12 AND THE
BOTTOM OF FOUR STRUTS 56

Interference drag for each strut to wing connection = $C_{d.int}$ × sweep dynamic pressure × thickness factor

| | | | |
|---|---|---|---|
| (i) | top of inner strut and wing 50 | 5.73 lbs | |
| | = 0.05 × 144.665 × 0.7925 = | | |
| (ii) | bottom of inner strut and wing 12 | 16.1 lbs | |
| | = 0.08 × 144.665 × 1.3875 = | | |
| Total for each inner strut | | 21.83 | |
| for two inner struts, total 2 × 21.83 | | | 43.7 lbs |
| (iii) | top of outer strut and wing 50 | 5.7 lbs | |
| | = 0.05 × 144.665 × 0.7925 = | | |
| (iv) | bottom of outer strut and wing 12 | 9.1 lbs | |
| | = 0.08 × 144.65 × 0.785 = | | |
| Total for each outer strut | | 14.8 lbs | |
| for two outer struts 2 × 14.8 | | | 29.6 lbs |

It is to be noted that profile drag coefficient, $C_{dpm}$ for the main wing 12 is taken from "Theory of Wing Sections" by Abbot, et al, referenced above, at page 625. Similarly, the coefficient for the interference drag between the fuselage and main wing 12 is taken from "Aerodynamics, Aeronautics And Flight Mechanics" by McCormick, referenced above. This reference at page 167 is also used to determine the interference drag between the supplementary wing 50 and the fuselage. Note that as the supplementary wing 50 has a very high aspect ratio, the interference drag coefficient is low and half that for the corresponding coefficient for the main wing to fuselage connection. For the connections between the struts and the two wings, coefficients $C_{d.int}$ were obtained from "Fluid-Dynamic Drag", by Dr. Hoerner, published by Hoerner Fluid Dynamics, Albuquerque, N.M., 1965, pages 8–10.

The following Table 10 sets out a summary of the drag figures for the Boeing 757-300 both with and without the DRS 50 of the present invention.

TABLE 10

DRAG SUMMARY OF BOEING 757-300 WING WITH AND WITHOUT THE DRS (i) Wing 12 without the DRS:

| | |
|---|---:|
| Wing 12 profile drag | 3,317.3 lbs |
| Wing 12 induced drag | 8,653.9 lbs |
| Wing 12 to fuselage 10 interference drag | 132.7 lbs |
| Total wing 12 drag | 12,103.9 lbs |

(ii) Wing 12 with the DRS:

| | |
|---|---:|
| Wing 12 profile drag | 1,442.3 lbs |
| Wing 12 induced drag | 519.2 lbs |
| Wing 12 to fuselage interference drag | 57.7 lbs |
| Total wing 12 drag plus the DRS | 2,019.2 lbs |
| (iii) Supplementary wing 50 profile drag | 2,658.2 lbs |
| Supplementary wing 50 induced drag | 2,337.1 lbs |
| Profile drag of 4 struts 56 | 126.8 lbs |
| Supplementary wing 50 to fuselage 10 interference | 52.8 lbs |
| Total interference drag of 2 inner struts | 43.7 lbs |
| Total interference drag of 2 outer struts | 29.6 lbs |
| Total drag of the DRS | 5,248.2 lbs |
| Total drag of wing 12 (from (ii)) | 2,019.2 lbs |
| Total drag of DRS plus total drag of wing 12 | 7,267.4 lbs |

(iv) Calculation of percentage drag reduction

| | |
|---|---:|
| Total Boeing 757-300 wing drag without the DRS | 12,103.9 lbs |
| Boeing 757-300 wing drag plus the DRS drag | 7,267.4 lbs |
| Drag reduction | 4,836.5 lbs |
| Boeing 757-300 total aircraft lift to drag ratio without the DRS = L/D = 12 | |
| Total Boeing 757-300 aircraft drag without the DRS at the point of half range cruise = 233,500/12 | 19,458.3 lbs |
| Percentage drag reduction = (4,836.5/19,458.3) 100 | 24.86% |

In Table 10, section (iv) the lift to drag ratio of 12 is again taken from the reference "Handling The Big Jets" by Davies, referenced above, at page 46.

Table 10 shows that the combined profile and interference drag for the conventional wing 12 is approximately 3,450.0 lbs. For the modified aircraft with the DRS of the present invention, this increases to 3,577.7 lbs as might be expected. Additionally, there is 126.8 lbs of profile drag resulting from the inclusion of the struts 56, so that the total drag, excluding induced drag is 3,704.5 lbs. Thus, drag excluding induced drag increases by 254.5 lbs.

The Boeing 757-300 wing induced drag without the supplementary wing is 8,653.9 lbs. When the supplementary wing is added and carries 75% of the half range weight, the Boeing 757-300 conventional wing carries 25% of the half range weight. This reduces the Boeing 757-300 wing induced drag to 519.2 lbs. The reduction in the Boeing wing induced drag is 8,653.3 lbs–519.2 lbs=8.134.7 lbs. However, the supplementary wing induced drag is 2,324 lbs. The final total induced drag reduction is 8,653.9 lbs–2,856.3 lbs=5,797.6 lbs.

Thus, what this example shows is that an intuitive reaction that the inclusion of an additional wing in a high speed aircraft would increase drag is wrong. In fact, because of the much improved induced drag performance, the overall drag is reduced significantly, by in excess of 5,000 pounds. The following Table 11 gives a mathematical iteration, which takes into account the fuel savings, which in turn reduces aircraft weight, average drag, etc.

TABLE 11

MATHEMATICAL ITERATION

| | |
|---|---:|
| Weight of fuel used in cruising flight | 63,000 lbs |
| Percentage drag reduction | 24.86% |
| Fuel saved by the DRS = 24.86% × 63,000 = | 15,661.8 lbs |
| Fuel saved at the half range cruising flight = 15,661.8/2 | 7,830.9 lbs |
| Previous half range weight | 233,500 lbs |
| New half range weight without the DRS = 233,500 − 7,830.9 | 225,669.1 lbs |
| Weight of the DRS | 10,160 lbs |
| New half range weight with the DRS = 225,669.1 + 10,160.0 | 235,829.1 lbs |
| Weight carried by the Boeing 757-300 wing | 57,692 lbs |
| Supplementary wing new lift = 235,829.1 − 57,692 | 178,137.1 lbs |
| 178,137.1 = $C_{ls}$ × 144.665 × 1,470 sq ft = $C_{ls}$ × 212,657.55 | |
| $C_{ls}$ = 178,137.1/212,657.55 | 0.83767 |
| Supplementary wing $C_{dps}$ = | 0.0096 |
| Supplementary wing new profile drag = 0.0096 × 144.665 × 1,470 sq ft | 2,041.5 lbs |
| Supplementary wing new $C_{dis}$ = $0.83767^2/3.1416$ × 0.9 × 24.642 = 0.70169/69,6738 = | 0.0101 |
| Supplementary wing new induced drag = 0.0101 × 144.665 × 1,470 sq ft = | 2,147.9 lbs |
| Supplementary new profile drag | 2,041.5 lbs |
| Supplementary new wing to fuselage interference drag = 0.02 × 2.041.5 = | 40.8 lbs |
| Profile drag of 4 struts | 126.8 lbs |
| Total interference drag of 2 struts 30 ft from the fuselage center line | 43.7 lbs |
| Total interference drag of 2 struts 60 ft from the fuselage center line | 29.6 lbs |
| New total drag of the DRS = 2,147.8 + 2,041.5 + 40.8 + 126.8 + 43.7 + 29.6 = | 4,430.3 lbs |
| Previous total drag of the DRS = 2,658.2 + 2,337.2 + 126.8 + 52.8 + 43.7 + 29.6 = | 5,248.6 lbs |
| Drag improvement from mathematical iteration = 5,248.6 − 4,430.3 = | 818.3 lbs |
| Previous drag reduction | 4,836.5 lbs |
| Drag improvement from mathematical iteration = 4,836.5 + 818.3 = | 5,654.8 lbs |
| Boeing 757-300 total lift to drag ratio without the DRS = L/D = | 12 |
| Total Boeing 757-300 aircraft drag without the DRS at the point of half-range cruise = 233,500/12 = | 19,458.3 lbs |
| New percentage drag reduction = (5,654.8/19,458.3) 100 = | 29.1% |

The profile drag coefficient of the supplementary wing 50 is again taken from the Abbot et al reference at page 463.

Clearly, this Table 11 makes a number of broad assumptions and simplifications. Thus, this table again simply calculates the performance at a mid-range point. It first calculates the fuel savings due to the reduced drag, which in turn reduces the lift requirements for the wing. The reduced lift requirement then reduces the drag. One main assumption here is that any reduction in drag is provided by the DRS. Note also that this iteration could be continued, since with the new drag calculation, one could go back and calculate a further reduction in the fuel load requirement, etc.

Nonetheless, what this Table 11 shows is that, based on this analysis, there is a net drag reduction of 29.1%.

It is to be appreciated that in this example, it is important to maintain the lift coefficient, $C_{IS}$, of the supplementary wing 50 close to 0.80. Correspondingly, the lift coefficient of the main wing 12, i.e. the conventional wing of a Boeing 757-300, is maintained close to 0.20. The effect of this is to ensure that approximately 75% of the lift is provided by the supplementary wing 50, and only about 25% of the lift by the conventional wing 12. As the induced drag coefficient depends upon the square of the lift coefficient, this results in a large decrease in the induced drag of the low aspect ratio of the main wing 12.

This characteristic will have to be designed into the aircraft. This is complicated by the velocity $V_n$, which is normal to the quarter chord of both wings. The calculations here are intended to demonstrate the feasibility of the invention and the significant drag savings that can be obtained. It will be appreciated by a person skilled in this art that a full and final design can only be achieved by computational fluid dynamics and extensive wind tunnel testing, in known manner. For example, such testing and calculations would enable the location of the supplementary wing 50 to be set with respect to its center of lift, and to establish the angles of incidence of the two wings 12, 50 to give the desired lift coefficients.

It is believed that there is a fundamental reason why such a configuration has not been proposed before. NACA, the predecessor of NASA, and various researchers in aircraft companies have carried out an enormous amount of work on wing characteristics and aircraft drag. All of this work has been based on aerodynamics. The structural requirements have played a subordinate role, although wing profiles have been developed bearing in mind the loads and bending moments required to support the aircraft. For example, it is believed that the relatively thick profile of the Boeing 757 wing towards its root is provided, so as to give significant wing thickness, which in turn gives adequate structural strength to support the bending moment which reaches a maximum at the root of each wing.

As noted, earlier proposals in the field of aircraft development have combined two or more wings in a single aircraft. However, the focus has been on the aerodynamic design, with each wing contributing generally equally both in terms of structural strength and aerodynamic characteristics. There has been no general realization that aerodynamic and structural requirements can be separated.

The simple example given above is based on a conventional aircraft. It will be appreciated that, if the lift requirement of the main wing 12 is reduced by 75%, then this opens up the possibility of completely redesigning this wing. It can be noted that, even with the supplementary wing 50, the main wing still has a large profile drag of 1442.3 lbs (Table 10). As the main wing 12 is carrying a reduced load, for some aircraft designs, it may be beneficial to redesign this wing significantly, e.g. by reducing the wing area to give a higher aspect ratio. But, the key requirement is to optimize the wing design for drag minimum drag while retaining the necessary structural strength.

However, it must be borne in mind that the main wing 12 of a Boeing 757-300 aircraft, as for any modern aircraft, has a number of extremely important features. Firstly, it has a very complicated but highly effective lift increasing devices that are part of both the trailing and leading edges. These devices take up a substantial part of the wing area. The Boeing 757-300 is at the limit of take-off field length and landing speed. If the wing area was reduced, this would reduce the area of the high lift devices.

The conventional main wing has a powerful and retractable aerodynamic braking system. If the wing area was reduced, the area of this braking system would be reduced.

The two outer portions of the trailing edge of the conventional wing 12 have an aileron system that controls the amount of bank in turning flight. The exact amount of bank is vital during take-off and landing procedures. The length and chord of the ailerons cannot be reduced because of the low aspect ratio of the conventional wing. If the wing was redesigned, e.g. by reducing the area, this would likely lead to extreme difficulty in maintaining an equivalent aileron system and equivalent high lift devices for take-off and landing. To keep the landing speed to an acceptable level, it is believed that no significant reduction is the high lift devices would be acceptable.

Accordingly, any redesign of the main wing would be a substantial and complicated exercise. Nonetheless, for a design of a wholly new aircraft, a different approach could be taken to the design of the main wing. For example, at least for some applications, it may be possible to design the main wing, to allow for the fact that it is now taking a much reduced aerodynamic load in cruising flight, e.g. by incorporating at least part of one or more of the aileron system, the braking system, the high lift system and the fuel storage system into the supplementary wing. In other words, the main and supplementary wings would be designed together, bearing in mind all the requirements for the wings outlined above, to optimize all the different performance requirements.

The main wing 12 also has a fuel storage system that is capable of storing 76,983 lbs of fuel for the Boeing 757-300. This fuel storage system takes up all of the usable space in the main wing 12. This usable space cannot be increased because of the space taken up by the necessary high lift devices and because the cantilevered beam system makes it necessary to use a large number of fuel tanks.

Additionally, the example above assumes a simple pin jointed connection between the struts and the two wings 12, 50, so that most of the structural strength would still be provided by the wing 12.

The Boeing 757-300 wing is designed to carry a maximum load of 270,000 lbs during take-off. The supplementary wing is designed to carry 178,140.5 lbs in cruising flight (after mathematical iteration). However, all of the supplementary wing lift is not transferred to the wing structure 12. 22,000 lbs of supplementary wing lift is transferred to the top of the fuselage. This leaves 156,140.5 lbs. that is carried by the wing structure 12. The wing area of the wing structure 12 produces 57,692 lbs. without the additional load imposed by the four struts 56. Therefore, the wing structure 12 now carries 57,692 lbs+156,140.5 lbs.=213,832.5 lbs. in cruising flight which is 79.2% of the maximum design load of 270,000 lbs. This leaves a considerable structural reserve to look after the increased bending moments. Calculations show that the reserve would look after about 50% of the increased bending moments. However, the wing 12 would have a 15% thickness to chord ratio that is constant from root to tip. This could easily take care of the remaining 50% of the bending moments, with no increase in weight. It is possible that the structural engineers would design a wing with a thickness to chord ratio that is reduced from root to tip. However, the reduction would not be as severe as the original wing 12 for the Boeing 757-300.

Thus, the next step in the development of this invention is the realization that the wings 12, 50, together with the struts 56 need to be designed together to provide the requisite structural strength. These could be designed together in known manner, using known structural techniques for two-dimensional frames and the like. In effect, in known manner, the wings 12, 50 could act as a composite beam, with the upper wing 50 being largely in compression while the lower wing 12 is in tension.

To summarize, the logical development of this invention is:

(1) the realization that the largest element of drag for many modern high performance aircraft with a low aspect ratio wing is induced drag;
(2) to improve performance, induced drag needs to be reduced;
(3) the only way to reduce induced drag is to provide a higher aspect ratio wing;
(4) a high aspect ratio wing will lead to increased bending moments in the wing;

(5) the realization, key to the present invention that it is not necessary for the structural strength to be provided by the wing itself, but that the structural and aerodynamic requirements can be separated;

(6) providing a structure separate from the wing for providing the necessary structural strength, in order to enable a long, high aspect ratio wing to be provided;

(7) the high aspect ratio wing can itself be relatively lightweight and either need not contribute to the structural strength of the wing, or can act as one element of composite beam, i.e., so that the supplementary wing sections 52 are taking only tension or compression loads.

(8) appreciating that any additional profile and interference drag from this additional structure will be significantly less than a reduction in induced drag, giving overall reduced drag;

(9) the separate structure includes an additional structural element supporting the wing and extending outwardly from the fuselage. This additional element is spaced from the wing, to give the desired strength and may or may not, as required, contribute to the aerodynamic lift. It need not necessarily be parallel to the main wing.

The invention has been described as a modification to an existing aircraft. In this context, the wing 12 of the aircraft has been described as a "main wing". Correspondingly, the additional wing of the present invention, the wing 50 has been described as "supplementary wing". It is to be appreciated that, as described, when the supplementary wing 50 is providing 75% of the lift, then aerodynamically, the wing 50 becomes the "main wing". Then, the wing 12 is only providing a small element of the lift and its main function is to provide structural strength.

The invention is thus based on separation of the aerodynamic and structural elements of the wing. As described, this could be for a top wing configuration, i.e. the wing 50, where the wing extends from the top of the fuselage, with the support structure provided generally below it and connected to the fuselage. This is believed to be an optimum configuration, since the support structure is then largely in tension, and structures transferring tension loads can inherently be made lightweight and aerodynamically streamlined.

It will further be understood that the support structure would be provided partially above the wing and partially below it. In all cases, the key requirements are to provide: a wing that is elongate, has a high aspect ratio and is aerodynamically efficient; and provide the necessary structural support for the wing separately in a separate support structure, which optionally imparts additional lift, but which is otherwise designed to provide minimal interference and profile drag, any additional interference and profile drag being substantially less than additional drag, particularly induced drag, which would be incurred by an alternative low aspect ratio wing structure.

In either case, the support structure includes an additional structural element that extends from a fuselage or wing root outwardly, and spaced from the wing itself. This additional element can be parallel to the wing, or it could, for example, converge towards the wing. This additional element can be provided solely as a streamlined structural element, or alternatively, it can be configured to provide additional lift. In many cases, it will be a relatively short wing with a very low aspect ratio, so that it is undesirable for it to provide too much lift, as this would only reintroduce the large induced drag. On the other hand, for certain flight conditions, e.g. landing and taking off, it may be desirable to use this additional element as an aerodynamic lift element, to give lower landing and/or take-off speeds.

Where it is desired to form essentially a composite beam with, shown on the drawings, the wing 50 acting as the upper element of the beam and the wing 12/additional structural element as a lower element of the beam, then simple vertical struts will be insufficient to transfer loads between the beams. Rather, in known manner, it may be necessary to provide two or more struts extending at an angle to provide a triangulated structure. The final element of this structure could be an elongate strut, extending at an angle both to the wing 12/additional structural element and to the wing 50, and configured to be purely in tension.

The wing 12 also has a fuel storage system that is capable of storing 76,983 pounds of fuel. This requires a substantial number of tanks, because of the interference of the complicated high lift system, and the number of vertical beams that are part of the wing structure. However, this large weight of fuel is close to the center of lift of the main wing, and the supplementary wing, and it is a simple matter to control the trim of the aircraft as the fuel is used. Each turbofan engine produces 43,850 pounds of thrust at take-off. This produces a large twisting force on wing 12. However, the combination of wing chord, wing thickness, and wing weight, can easily take care of the large twisting force.

It can be noted that the additional structural element or wing 12 can be retained with a relatively large length (dimensioned in a longitudinal direction of the aircraft) relative to the length of the wing 50. This then would provide strength to the whole wing structure resisting drag loads on the wing. It can also provide torsional strength to the wing 50.

In known manner, the wing 50 can be provided with flaps, including possibly multiple flap considerations, to enable adequate lift to be provided at low landing and take-off speeds.

What is claimed is:

1. An aircraft comprising: a body; a supplementary wing comprising two wing, sections extending outwardly on either side of the body, to provide lift for the body; and a wing support structure for the supplementary wing extending between the body and the supplementary wing, wherein the supplementary wing is configured to reduce induced drag and the supplementary wing by itself has insufficient strength to support the aircraft, wherein the wing support structure comprises a main wing and provides additional strength to withstand loads applied to the supplementary wing by lift forces at least, wherein the main wing extends outwardly from the body spaced from the supplementary wing and the wing support structure includes at least two connections between the main wing and the supplementary wing transferring loads between the supplementary wing and the main wing, wherein the main wing has a low aspect ratio and the supplementary wing has a high aspect ratio, and wherein the main and supplementary wings are configurable to provide the supplementary wing with a higher lift coefficient than the main wing, thereby to provide an overall drag reduction.

2. An aircraft as claimed in claim 1, wherein each wing section of the supplementary wing comprises a supported inner section and a cantilevered section extending out from the supported inner section, the supported inner section being connected to the main wing by the connections.

3. An aircraft as claimed in claim 2, wherein the supported inner section of each wing extends over more than half the length of each wing section.

4. An aircraft as claimed in claim 3, wherein the connections comprise struts that are in tension between the supplementary wing and the main wing.

5. An aircraft as claimed in claim 2, wherein the main wing is adapted to provide part of the lift required for the aircraft during take-off and landing, and includes at least one of: high lift devices; ailerons; an air brake; and a fuel storage means.

6. An aircraft as claimed in claim 4, wherein the connections between the supplementary wing and the main wing comprise struts that are in tension, and which are mainly at right angles to the structural center line of both the supplementary wing and the main wing, whereby a large percentage of the lift of the supplementary wing is transferred to the main wing and loads resulting from lift forces on the main and supplementary wings are loads transferred through the main wing to the fuselage of the aircraft.

7. An aircraft as claimed in claim 6, wherein the supplementary wing provides between 65% to 85% of the total lift of the aircraft in cruising flight at least.

8. An aircraft as claimed in claim 1, wherein the body comprises an elongate fuselage, and wherein the aircraft includes an elevator that is hinged to a horizontal stabilizer, and a rudder that is hinged to a vertical stabilizer, all of which are located at the rear of the fuselage.

9. An aircraft as claimed in claim 2 wherein the support structure of the supplementary wing comprises a streamlined connection at the top of the fuselage, and at least two streamlined struts interconnecting the supplementary wing to the main wing.

10. An aircraft comprising: a body; a supplementary wing comprising two wing sections extending outwardly on either side of the body, to provide Lift for the body; and a wing support structure for the supplementary wing extending between the body and the supplementary wing, wherein the supplementary wing is configured to reduce induced drag and the supplementary wing by itself has insufficient strength to support the aircraft, wherein the wing support structure comprises a main wing and provides additional strength to withstand loads applied to the supplementary wing by lift forces at least, wherein the main wing extends outwardly from the body spaced from the supplementary wing and the wing support structure includes at least two connections between the main wing and the supplementary wing transferring loads between the supplementary wing and the main wing, wherein the supplementary wing has an area that is greater than 60% of the area of the main wing, and wherein the supplementary wing and the main wing are configurable to provide lift coefficients such that the supplementary wing provides between 65 to 85% of the total lift of the aircraft in cruising flight at least, thereby to reduce the induced drag and to provide an overall drag reduction for the aircraft.

11. An aircraft as claimed in claim 10, wherein the main wing has a low aspect ratio in the range 7 to 11, and wherein the supplementary wing has a high aspect ratio in the range 15 to 30.

12. An aircraft as claimed in claim 8, wherein the supplementary wing has a sweep back angle, measured at the quarter chord position of approximately 25°.

13. A method of reducing the drag of an existing high speed aircraft, which comprises a body, an existing wing structure having a low aspect ratio wing and capable of providing all the lift for the aircraft, the method comprising:

(a) providing a supplementary wing comprising a pair of supplementary wing sections and having a higher aspect ratio than the existing wing but insufficient strength to transfer the full lift required to the aircraft fuselage, whereby the supplementary wing has a relatively light weight.

(b) attaching the supplementary wing to the body and the existing wing of the aircraft; and (c) arranging for the supplementary wing and the existing wing structure to be configurable to provide the supplementary wing with a higher lift coefficient than the main wing structure, whereby a major portion of the lift required for the aircraft is provided by the supplementary wing, whereby a substantial part of the lift provided by the supplementary wing is transferred to the existing wing structure and whereby the total induced drag is reduced by an amount greater than any drag increase resulting from the addition of the supplementary wing, thereby to reduce the total drag.

14. A method as claimed in claim 13 which includes providing each supplementary wing section as an inner supported section and an outer cantilevered section; and attaching the inner supported section to the respective existing wing at a plurality of points.

15. A method as claimed in claim 14, which includes providing a supplementary wing structure for an aircraft having an existing low mount wing extending out from the bottom of the body, the method comprising mounting the supplementary wing to the top of the body and spaced above the existing wing.

16. A method as claimed in claim 15, which includes providing at least one strut for each supplementary wing section connecting the supplementary wing section to the existing wing.

17. A method as claimed in claim 16, includes providing a at least two struts for each supplementary wing section connecting each supplementary wing section to the existing wing.

18. A method as claimed in claim 17, which includes providing an inner supported section for each supplementary wing which is at least a major portion of the length of each supplementary wing.

19. A method as claimed in claim 18, which includes the supplementary wing such that at least 65% of the total lift is provided by the supplementary wing.

20. A method as claimed in claim 19, which includes providing a supplementary wing with a wing section having a ratio for the chord thickness to chord length which is substantially less than that for the existing wing.

* * * * *

UNITED STATES PATENT AND TRADEMARK OFFICE
CERTIFICATE OF CORRECTION

PATENT NO. : 6,340,134 B1
DATED : January 22, 2002
INVENTOR(S) : Ronald G. Meschino It is certified that error appears in the above-identified patent and that said Letters Patent is hereby corrected as shown below:

Column 8,
Line 55, replace "drag coefficient of 0.300." by -- drag coefficient of 0.0300. --

Signed and Sealed this

Second Day of July, 2002

*Attest:*

JAMES E. ROGAN
*Director of the United States Patent and Trademark Office*

*Attesting Officer*